(12) United States Patent
Kim et al.

(10) Patent No.: US 8,175,164 B2
(45) Date of Patent: May 8, 2012

(54) DEVICES AND METHODS FOR DATA COMPRESSION AND DECOMPRESSION

(75) Inventors: Bom-Yun Kim, Seoul (KR); Jong-Seon Kim, Gyeonggi-do (KR); Shi-Hwa Lee, Seoul (KR); Sang-Jo Lee, Gyeonggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1650 days.

(21) Appl. No.: 11/469,558

(22) Filed: Sep. 1, 2006

(65) Prior Publication Data

US 2007/0047654 A1  Mar. 1, 2007

(30) Foreign Application Priority Data

Sep. 1, 2005 (KR) .................. 10-2005-0081135

(51) Int. Cl.
*H04N 7/12* (2006.01)
(52) U.S. Cl. .............. 375/240.18; 375/240.03
(58) Field of Classification Search ............. 375/240, 375/240.01, 240.03, 240.12, 240.18, 240.02; 382/166

See application file for complete search history.

(56) References Cited

U.S. PATENT DOCUMENTS

RE36,380 E * 11/1999 Juri ................ 375/240.03
6,144,763 A * 11/2000 Ito .................... 382/166

FOREIGN PATENT DOCUMENTS

| CN | 1031680 C | 4/1996 |
| CN | 1182488 C | 12/2004 |
| JP | 2002-044662 | 2/2002 |
| JP | 2003-023627 | 1/2003 |
| KR | 2004-18483 | 3/2004 |

OTHER PUBLICATIONS

Chinese Office Action (8 pages) corresponding to Chinese Patent Application No. 200610128057.5; Dated: Jul. 17, 2009.

* cited by examiner

*Primary Examiner* — Allen Wong
(74) *Attorney, Agent, or Firm* — Myers Bigel Sibley & Sajovec, P.A.

(57) ABSTRACT

A device for data compression includes a domain transformer unit, a classifying unit, a variable length encoder, a fixed length encoder and a memory unit. The domain transformer unit transforms time-domain data into frequency-domain data. The classifying unit determines an encoding type of the frequency-domain data based on occurrence probability of the frequency-domain data. The variable length encoder encodes first frequency-domain data that are determined to be encoded by variable length coding. The fixed length encoder encodes second frequency-domain data that are determined to be encoded by fixed length coding. The memory unit stores the encoded first and second frequency-domain data by relocating the encoded first and second frequency-domain data such that the encoded first frequency-domain data are placed adjacently and the encoded second frequency-domain data are placed adjacently. Therefore, the time for decoding the corresponding data may be reduced.

8 Claims, 5 Drawing Sheets

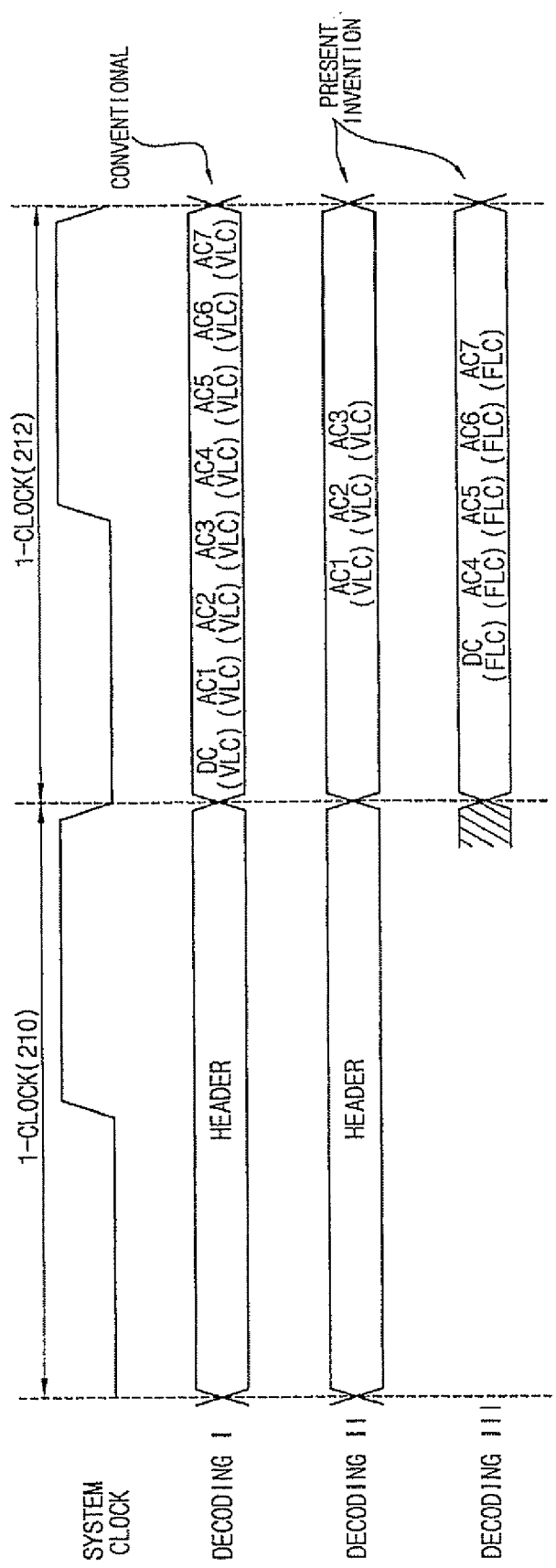

DEVICES AND METHODS FOR DATA COMPRESSION AND DECOMPRESSION

CROSS-REFERENCE TO RELATED APPLICATION

This application claims priority under 35 USC §119 to Korean Patent Application No. 2005-81135, filed on Sep. 1, 2005, in the Korean Intellectual property Office, the disclosure of which is incorporated herein in its entirety by reference.

FIELD OF THE INVENTION

The present invention relates to data processing, and more particularly to the methods and apparatuses of data coding compressing/decompressing.

BACKGROUND

Various data compression encoding techniques are used for efficiently storing and transferring data. Currently available data compression encoding techniques may be generally classified as variable length coding (VLC) or fixed length coding (FLC).

VLC performs a data encoding process such that a length of codeword used for coding data may vary in length. That is, in VLC, data is encoded by using codewords having different lengths based on occurrence probabilities of data. Hereinafter, a VLC compression encoding technique is explained in more detail.

Generally, compression of video and audio data includes a process of transforming time-domain data into frequency-domain data. In the transforming process, a Fourier transform may be used such that "n" values in the time domain are represented by "n" values in the frequency domain. The transform coding method can convert video or audio signals into transform coefficients, which are further classified into a DC coefficient and an AC coefficient. The DC coefficient represents an average value of a predetermined block of input signals and the AC coefficient represents a value corresponding to components of the predetermined block of input signals. The AC coefficient is configured such that the AC coefficient value converges to a constant value as the calculation number is increased. Therefore, data having high occurrence probability may be encoded as codewords having a length of one bit or two bits when VLC is applied. In this manner VLC encoding can decrease a length of codeword to economize the size of memory required to store encoded data.

In some cases, however, information loss may occur due to quantization. A bit-by-bit analysis from a first bit of encoded data can be used for VLC because lengths of codeword vary during a decoding process. In addition, headers can be used to indicate a start point and an end point of encoded data. A decoder can be used to analyze encoded data bit by bit in order to detect the start point and the end point of encoded data. Therefore, VLC decoding can utilize a large decoding circuit and/or more processing time to decode VLC data.

Alternatively, FLC can use codewords having a fixed length. An FLC decoder may analyze encoded data by a fixed number of bits because FLC uses fixed length codewords. Since headers indicating the start point and the end point of encoded data are not required, FLC decoding circuits are generally smaller than those used in decoding using VLC. Similarly, the processing time for decoding data encoded by FLC is generally less than that of data encoded by VLC.

FLC, however, assigns a fixed length codeword to data having a high occurrence probability, which results in relatively large blocks of encoded data. The large blocks may not be suitable for compressing data that contains significant data content such as video and audio signals.

Hereinafter, the effect of data compression that uses a disproportion in occurrence probabilities of data is explained. Consider the example where four kinds of data—"0" "1," "2" and "3" are encoded using a two-bit fixed length binary codeword such as binary values "00," "01," "10" and "11." A disproportion in occurrence probabilities of data may be considered so that codewords having different lengths are respectively assigned to each of the four kinds of data as shown in the following Table 1.

TABLE 1

| Data | Occurrence probability | Codeword | Length of codeword |
|---|---|---|---|
| 0 | 0.6 | 0 | 1 |
| 1 | 0.2 | 10 | 2 |
| 2 | 0.1 | 110 | 3 |
| 3 | 0.1 | 111 | 3 |

In this example, when a codeword having the fixed length is assigned to each kind of data, an average length of the codeword is 2.0 bits, as determined by the following equation:

Average length of FLC codeword=2×0.6+2×0.2+2×0.1+2×0.1=2.0 (bits)

Applying VLC principles to the example above, when codewords having different length are assigned to each of the four kinds of data as shown in Table 1, an average length of codewords may be smaller than 2 bits as represented in the following equation:

Average length of VLC codeword=1×0.6+2×0.2+3×0.1+3×0.1=1.6 (bits)

Thus, although VLC can be advantageous for compressing data having a disproportion in occurrence probabilities, such as is often present in video or audio signals, the VLC may utilize more processing time in decoding encoded data compared with FLC. The additional processing time can be realized because bit-by-bit analysis from a first bit of encoded data may be performed due to the variable lengths of the codewords, such that detection of header indicating the start point and the end point of encoded data may be necessary.

SUMMARY

Embodiments of the present invention provide devices and methods for data compression. In this regard, some embodiments can be implemented as a device that includes a domain transformer unit configured to transform time-domain data into frequency-domain data and a classifying unit configured to determine an encoding type of the frequency-domain data based on an occurrence probability of the frequency-domain data. The device also includes a variable length encoder configured to encode first frequency-domain data that are determined to be encoded by a variable length coding and a fixed length encoder configured to encode second frequency-domain data that are determined to be encoded by a fixed length coding. The device further includes a memory unit configured to store the encoded first and second frequency-domain data respectively encoded by the variable length encoder and the fixed length encoder, the encoded first and second frequency-domain data being relocated such that the encoded first frequency-domain data may be placed adjacent to each other and the encoded second frequency-domain data may be placed adjacent to each other.

In further embodiments, the classifying unit may determine that a predetermined number of frequency-domain data having a high occurrence probability is encoded by the fixed length coding and the other frequency-domain data are encoded by the variable length coding. The classifying unit may also determine that four frequency-domain data having four highest occurrence probabilities are encoded by the fixed length coding. The classifying unit may further determine DC values unrelated to a disproportion of occurrence probability are encoded by the fixed length coding.

In other embodiments, the memory sequentially stores the encoded second frequency-domain data encoded by the fixed length encoder and then stores the encoded first frequency-domain data encoded by the variable length encoder next to the encoded second frequency-domain data.

In yet other embodiments, methods of data compression are provided. In this regard, some embodiments can be implemented as methods that include transforming input time-domain data into frequency-domain data and determining an encoding type of the frequency-domain data based on an occurrence probability of the frequency-domain data. Such methods can also include encoding first frequency-domain data that are determined to be encoded by a variable length coding, encoding second frequency-domain data that are determined to be encoded by a fixed length coding, and storing the encoded first and second frequency-domain data respectively encoded by the variable length encoder and the fixed length encoder by relocating the encoded first and second frequency-domain data such that the encoded first frequency-domain data may be placed adjacent to each other and the encoded second frequency-domain data may be placed adjacent to each other.

In some embodiments, a predetermined number of frequency-domain data having a high occurrence probability may be encoded by the fixed length coding and the other frequency-domain data may be encoded by the variable length coding. In yet other embodiments, four frequency-domain data having four highest occurrence probabilities may be encoded by the fixed length coding. In other embodiments, DC values unrelated to a disproportion of the occurrence probability may be encoded by the fixed length coding.

In further embodiments, the encoded second frequency-domain data encoded by the fixed length encoder may be sequentially stored, and then the encoded first frequency-domain data encoded by the variable length encoder may be stored next to the encoded second frequency-domain data.

In still other embodiments, a device for data decompression can include a memory unit configured to store first frequency-domain data encoded by a variable length encoder and second frequency-domain data encoded by a fixed length encoder, the encoded first and second frequency-domain data being relocated such that the encoded first frequency-domain data may be placed adjacent to each other and the encoded second frequency-domain data may be placed adjacent to each other. The device can also include a variable length decoder configured to decode the first frequency-domain data encoded by the variable length encoder, a fixed length decoder configured to decode the second frequency-domain data encoded by the fixed length encoder, and a domain transformer unit configured to transform the decoded first and second frequency-domain data into time-domain data.

In yet other embodiments, methods of data decompression are provided. Such methods can include decoding first variable length coded data among a plurality of variable length coded data encoded by a variable length coding method while fixed length coded data encoded by a fixed length encoding method are decoded and sequentially decoding second variable length coded data among the plurality of variable length coded data, the second variable length coded data including the other variable length coded data among the plurality of variable length coded data except the first variable length coded data.

In further embodiments, the plurality of variable length coded data may be simultaneously decoded by applying conditional branches to the plurality of variable length coded data in order to decode data during a single clock cycle while the fixed length coded data are decoded by the fixed length decoding.

BRIEF DESCRIPTION OF THE DRAWINGS

FIG. 5 is a timing chart showing a comparison of a single clock cycle of decoding data that was encoded using a conventional method with that of data encoded by a coding method according some embodiments disclosed herein.

DETAILED DESCRIPTION

Figure 1:
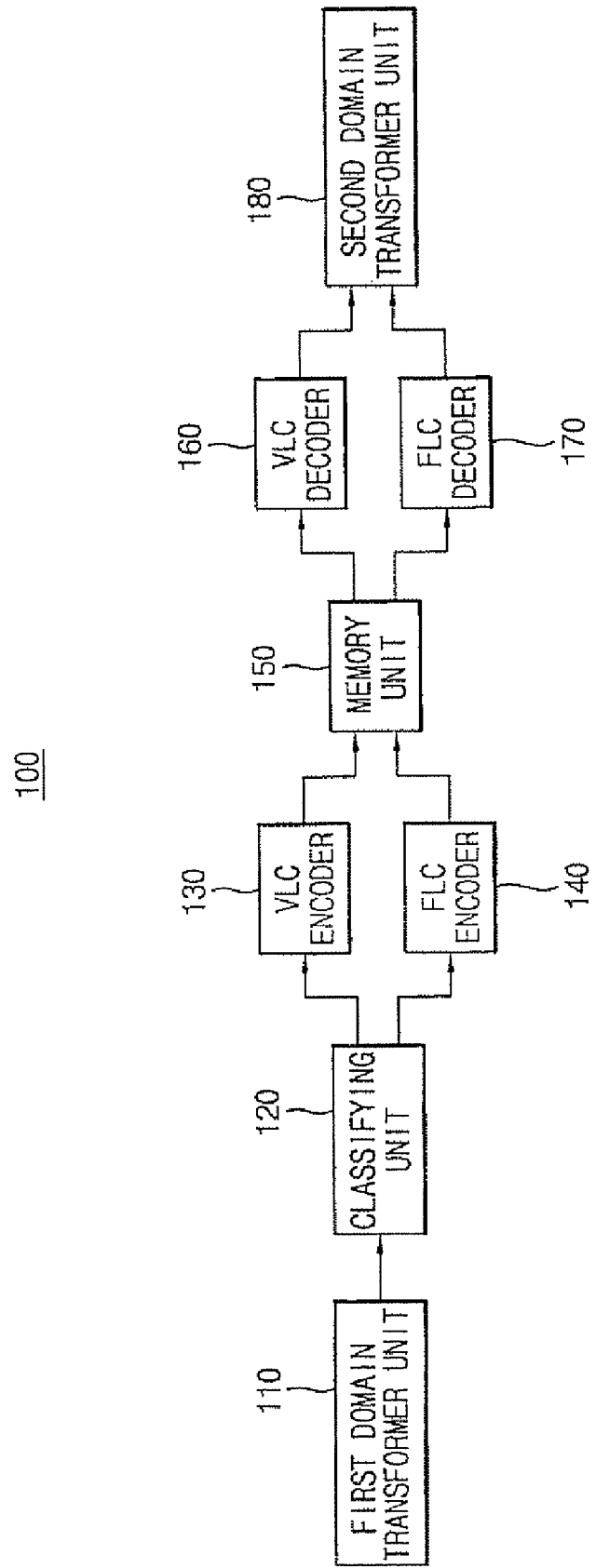
FIG. 1 is a block diagram showing a data coding apparatus according to an example embodiment of the present invention.

Embodiments of the present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

FIG. 1 is a block diagram showing a data coding apparatus according to an example embodiment of the present invention. As shown in FIG. 1, the data coding apparatus include a first domain transformer unit 110, a classifying unit 120, a VLC encoder 130, a FLC encoder 140 and a memory unit 150. The data decoding apparatus may include a VLC decoder 160, a FLC decoder 170 and a second domain transformer unit 180.

The first domain transformer unit 110 is configured to transform time-domain input data into frequency-domain data. The classifying unit 120 determines a suitable encoding type (VLC or FLC) for the data transformed by the first domain transformer unit 110. The classifying can be based on the occurrence probabilities of the data transformed by the first domain transformer unit 110. According to the encoding type, the classifying unit 120 transfers the transformed data to the VLC encoder 130, which encodes the transformed data by using codewords having variable lengths or the FLC encoder 140, which encodes the transformed data by using codewords having a fixed length.

The memory unit 150 then stores data encoded in the VLC encoder 130 and the FLC encoder 140. In storing the data, the memory unit 150 relocates the encoded data according to the encoding type used for the encoded data. For example, the memory unit 150 relocates the encoded data so that data encoded by VLC is located adjacent the other VLC data. Similarly, the memory unit 150 relocates the data encoded by FLC to be adjacent the other FLC encoded data.

The encoded data is decoded by the type of encoding used. For example, the VLC decoder 160 decodes the data that is transformed using codewords having the variable lengths whereas, the FLC decoder 170 decodes the data that is transformed using codeword having a fixed length. The second domain transformer unit 180 can then transform the frequency-domain data received from the VLC decoder 160 and the FLC decoder 170 into time-domain input data, which can be provided as an output.

Figure 2:
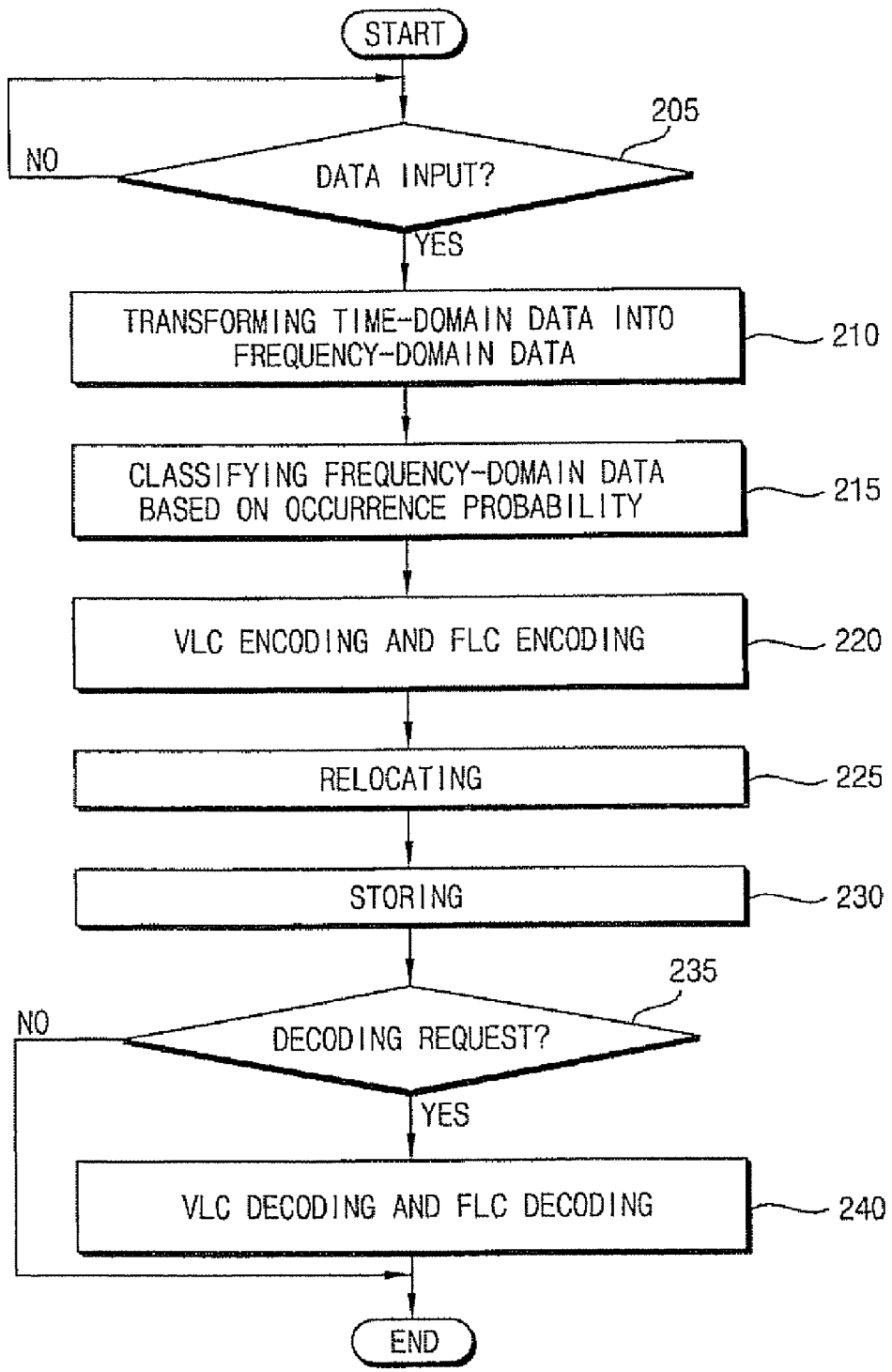
FIG. 2 is a flow chart showing a method of coding data and a method of decoding data according to an example embodiment of the present invention.

Reference is now made to FIG. 2, which is a flow chart showing a method of coding data and decoding data according to some embodiments of the present invention. The time-domain data is received (block 205) and transformed into frequency-domain data (block 210). The frequency-domain data is classified (block 215) to determine a suitable type of encoding. The classifying can be based on, for example, the occurrence probabilities of the data transformed. Using the occurrence probabilities of the encoded data, the data is classified to be encoded using either VLC or FLC (block 220). In addition to some of the AC values, any DC values that are generated during the data transform may be encoded by FLC. The transformed data is transferred to either a VLC encoder or an FLC encoder, depending on the encoding type. After receiving the transformed data, the VLC and FLC encoders encode their respective data. In this manner, the VLC encodes the transformed data by using a variable length codeword and the FLC encoder encodes the transformed data using a fixed length codeword.

The encoded data is then stored (block 230). Storing the encoded data includes relocating (block 225) the encoded data according to the type of encoding used. Specifically, the data encoded by VLC are located adjacent other VLC encoded data and the data encoded by FLC are located adjacent other FLC encoded data. After relocating, the encoded data is stored (block 230).

After storing the encoded data, decoding the encoded data can be requested (block 235). VLC and FLC decoding (block 240) can be performed on the encoded data that is stored in the memory. For example, VLC encoded data can be read from the memory and decoded (block 240) using VLC. Similarly, FLC encoded data can be read from the memory and decoded (block 240) using FLC.

Figure 3:
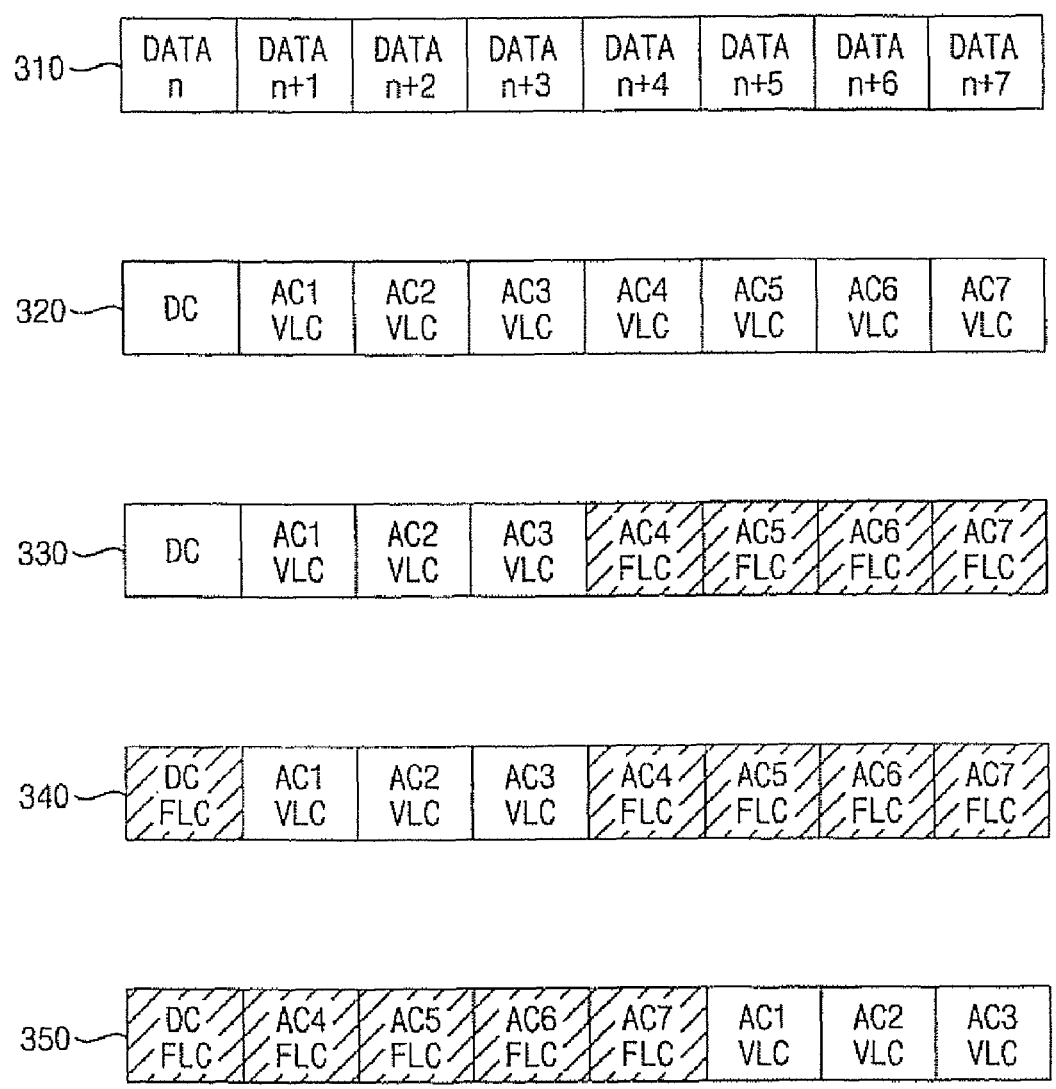
FIG. 3 is a schematic view showing changes of data during data coding process according to an example embodiment of the present invention.

Reference is now made to FIG. 3, which is a schematic view showing changes of data during data coding process according to some embodiments of the present invention. Time-domain data 310 are input into the first domain transformer unit 110. For example, the time-domain data 310 may include eight values (DATA n, DATA n+1, . . . , and DATA n+7), which can include information of a few bits each. The time-domain data 310 is transformed into frequency-domain data 320. In the present example, the eight time-domain data values 310 (DATA n, DATA n+1, . . . , and DATA n+7) are transformed into one DC information block and seven AC information blocks. In some embodiments, the seven AC information blocks of the frequency-domain data 320 are designated for encoding using VLC. The encoded data 330 can be data encoded from the frequency-domain data 320 such that AC4, AC5, AC6 and AC7 are determined to be encoded by FLC and AC1, AC2 and AC3 are determined to be encoded by VLC. This can occur, for example, when AC4, AC5, AC6 and AC7 have higher occurrence probabilities than AC1, AC2 and AC3. Encoded data 340 provides an example when a DC value that is unrelated to a disproportion occurrence probability is determined to be encoded by FLC in addition to selected AC information blocks. In this instance, encoded data 350 represents data that is relocated from the encoded data 340, such that the data encoded by the same encoding type are adjacent each other. For example, data that is encoded by FLC is stored adjacent other FLC encoded data and data that is encoded by VLC is stored adjacent other VLC encoded data.

As described above, eight time-domain data values are transformed into eight frequency-domain data 320. Each of the frequency-domain data values is encoded by VLC or FLC in accordance with occurrence probability thereof. Then, as shown in the frequency-domain data 350, the encoded data 340 is relocated in the memory so that the data encoded by the same encoding type are adjacent each other. For example, AC4, AC5, AC6 and AC7 are stored adjacent each other in the first region and AC1, AC2 and AC3 are stored adjacent each other in the second region.

Figure 4:
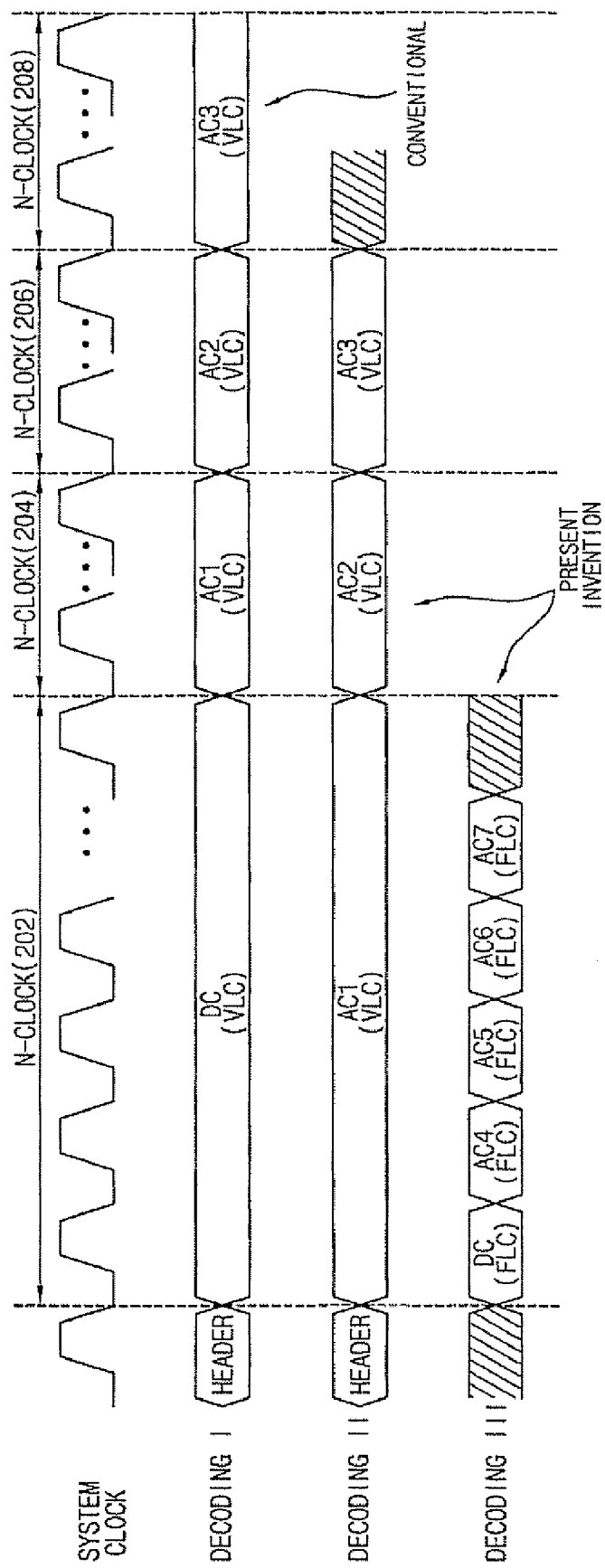
FIG. 4 is a timing chart showing a comparison of the processing time for decoding data encoded by a conventional coding method with that of data encoded by a coding method according to some embodiments of the present invention.

Reference is now made to FIG. 4, which is a timing chart showing a processing time of decoding data that is encoded by a coding method according to an example embodiment of the present invention in comparison with the data encoded by a conventional coding method. A system clock includes a plurality of clock periods 202, 204, 206 and 208. Decoding I of shows a timing in a conventional encoding process. As shown in the Decoding I, one data value is decoded during a unit clock period consisting of a few clock cycles (for example, "n" clock cycles). In comparison, Decoding II and Decoding III show timings in decoding process according to example embodiments of the present invention. Decoding II, for example, shows a timing in the process for decoding the data encoded by VLC and Decoding III shows a timing in the process for decoding the data encoded by FLC.

For data that is encoded by a conventional VLC coding method, as shown in the Decoding I of FIG. 4, bit-by-bit detection of encoded data through the final bit of encoded data is required. Therefore, if a binary code of VLC encoded data is 4 bits wide, 32 (4 bits×8 data, i.e. AC1 through AC7) clock cycles can be required to decode the data encoded by VLC. However, use of the coding method illustrated as Decoding II and Decoding III, data encoded by VLC can be decoded in 12 (4 bits×3 data, i.e. AC1 through AC3) clock cycles.

As shown in Decoding I, a DC value is decoded during a first clock cycle 202, a first VLC encoded AC value AC1 is decoded during a second clock cycle 204, a second VLC encoded AC value AC2 is decoded during a third clock cycle 206, and a third VLC encoded AC value AC3 is decoded during a fourth clock cycle. Therefore, seven clock cycles elapse before AC value AC7 that was encoded by VLC can be decoded under the conventional coding method. However, in case of data that is encoded by the coding method of Decoding II and Decoding III, all of FLC encoded values (DC, AC4 through AC7) and a first VLC encoded AC value AC1 are decoded during a first clock cycle 202. In addition, a second VLC encoded AC value AC2 is decoded during a second clock cycle 204, and a third VLC encoded AC value AC3 is decoded during a third clock cycle 206. In this manner, decoding time is decreased because only three clock cycles are required to decode data encoded by the coding method described herein.

Reference is now made to FIG. 5, which is a timing chart showing a comparison of a single clock cycle of decoding data that was encoded using a conventional method with that of data encoded by a coding method according some embodiments disclosed herein. A system clock includes a first clock cycle 210 and a second clock cycle 212. The illustration of Decoding I shows a timing in a conventional decoding process. Decoding II and Decoding III show timings in decoding processes according to some embodiments of the present invention. Generally, in order to decode DC values and AC values in a single clock cycle, a number of conditional branches are used. For example, $2^{4\times8}$ (8 represents (DC, AC1 through AC7) conditional branches are required for decoding VLC encoded data consisting of one DC value and seven AC values.

The coding method according to some embodiments of the present invention can use $2^{4\times5}$ (5 represents (DC, AC4 through AC7) conditional branches for decoding the data encoded by FLC. However, since the data encoded by FLC have high occurrence probabilities, less than $2^{4\times5}$ conditional branches may be used. That is, less than $2^{3\times5}$ (5 represents (DC, AC4 through AC7) conditional branches may be used for decoding the data encoded by FLC. Further, conditional branches corresponding only to three VLC encoded data (AC1 through AC3) are used. Therefore, $2^{4\times3}$ (3 represents (AC1, AC2, AC3) conditional branches may be necessary for decoding the data encoded by VLC. As a result, a total of $2^{3\times5}$ (5 represents (DC, AC4 through AC7)+$2^{4\times3}$ (3 represents (AC1, AC2, AC3) conditional branches are sufficient for decoding the data encoded by the coding method according to the example embodiments of the present invention in a single clock cycle. Therefore, the coding method of the present invention may reduce the number of conditional branches that are executed in order to decode data during a single clock cycle in comparison with the data encoded using the conventional coding method. Frequency-domain data that has a high occurrence probability can be encoded by a fixed length coding method, which may reduce the time for decoding the data. Also, data decoding may be effectively performed by taking advantage of the substantially complementary disadvantages of each of the VLC and the FLC.

While the example embodiments of the present invention and their advantages have been described in detail, it should be understood that various changes, substitutions and alterations may be made herein without departing from the scope of the invention.

What is claimed is:

1. A device for data compression, comprising:
   a domain transformer unit configured to transform time-domain data into frequency-domain data;
   a classifying unit configured to determine an encoding type of the frequency-domain data based on an occurrence probability of the frequency-domain data, wherein the classifying unit is configured to determine that first AC values having low occurrence probabilities are encoded by a variable length coding and second AC values having high occurrence probabilities are encoded by a fixed length coding;
   a variable length encoder configured to encode first frequency-domain data that are determined to be encoded by the variable length coding;
   a fixed length encoder configured to encode second frequency-domain data which are determined to be encoded by the fixed length coding; and
   a memory unit configured to store the encoded first frequency-domain data encoded by the variable length encoder and the second frequency-domain data encoded by the fixed length encoder,
   wherein the first and second frequency-domain data are relocated by relocating the encoded first frequency-domain data corresponding to one of the first AC values adjacent to other of the encoded first frequency-domain data corresponding to other of the first AC values and relocating the second frequency-domain data corresponding to one of the second AC values adjacent to other of the encoded second frequency-domain data corresponding to other of the second AC values.

2. The device of claim 1, wherein the classifying unit is further configured to determine that DC values unrelated to a disproportion of the occurrence probability are encoded by the fixed length coding.

3. The device of claim 1, wherein the memory is further configured to sequentially store the encoded second frequency-domain data encoded by the fixed length encoder and then store the encoded first frequency-domain data encoded by the variable length encoder adjacent other of the encoded first frequency-domain data.

4. The device of claim 1, wherein the encoded second frequency-domain data encoded by the fixed length encoder are sequentially stored, and then the encoded first frequency-domain data encoded by the variable length encoder are stored next to the encoded first frequency-domain data.

5. A device for data compression, comprising:
   a domain transformer unit configured to transform time-domain data into frequency-domain data;
   a classifying unit configured to determine an encoding type of the frequency-domain data based on an occurrence probability of the frequency-domain data, wherein the classifying unit is further configured to determine that four of the frequency-domain data having four highest occurrence probabilities are encoded by a fixed length coding and other of the frequency-domain data are encoded by a variable length coding;

a variable length encoder configured to encode first frequency-domain data that are determined to be encoded by the variable length coding;

a fixed length encoder configured to encode second frequency-domain data which are determined to be encoded by the fixed length coding; and a memory unit configured to store the encoded first frequency-domain data encoded by the variable length encoder and the encoded second frequency-domain data encoded by the fixed length encoder, wherein the first and second frequency-domain data are relocated by relocating the encoded first frequency-domain data adjacent to other of the encoded first frequency-domain data and relocating the encoded second frequency-domain data adjacent to other of the encoded second frequency-domain data.

6. A method of data compression, the method comprising:

transforming input time-domain data into frequency-domain data;

determining an encoding type of the frequency-domain data based on an occurrence probability of the frequency-domain data;

encoding, using a variable length encoder, first frequency-domain data that are determined to be encoded by a variable length coding, first AC values having low occurrence probabilities being encoded by the variable length coding;

encoding, using a fixed length encoder, second frequency-domain data that are determined to be encoded by a fixed length coding, second AC values having high occurrence probabilities being encoded by a fixed length coding;

storing the encoded first frequency-domain data encoded by the variable length encoder by relocating the encoded first frequency-domain data corresponding to one of the first AC values to be adjacent other of the encoded first frequency-domain data corresponding to other of the first AC values; and storing the encoded second frequency-domain data encoded by the fixed length encoder by relocating the encoded second frequency-domain data corresponding to one of the second AC values to be adjacent other of the second frequency-domain data corresponding to other of the second AC values.

7. The method of claim 6, further comprising encoding DC values unrelated to a disproportion of the occurrence probability using fixed length coding.

8. A method of data compression, the method comprising:

transforming input time-domain data into frequency-domain data;

determining an encoding type of the frequency-domain data based on an occurrence probability of the frequency-domain data;

encoding, using a variable length encoder, first frequency-domain data that are determined to be encoded by a variable length coding;

encoding, using a fixed length encoder, second frequency-domain data that are determined to be encoded by a fixed length coding;

storing the encoded first frequency-domain data encoded by the variable length encoder by relocating the encoded first frequency-domain data to be adjacent other of the encoded first frequency-domain data; and storing the encoded second frequency-domain data encoded by the fixed length encoder by relocating the encoded second frequency-domain data to be adjacent other of the second frequency-domain data, wherein encoding the second frequency-domain data and encoding the first frequency-domain data further comprises:

encoding four of the frequency-domain data having four highest occurrence probabilities using the fixed length coding; and encoding other of the frequency-domain data using the variable length coding.

* * * * *